United States Patent
Nakagawa et al.

(10) Patent No.: US 7,358,317 B2
(45) Date of Patent: Apr. 15, 2008

(54) POLYCARBOSILANE AND METHOD OF PRODUCING THE SAME

(75) Inventors: Hisashi Nakagawa, Tsukuba (JP); Masahiro Akiyama, Tsukuba (JP); Takahiko Kurosawa, Ibaraki (JP); Atsushi Shiota, San Jose, CA (US)

(73) Assignee: JSR Corporation, Tokyo (JP)

( * ) Notice: Subject to any disclaimer, the term of this patent is extended or adjusted under 35 U.S.C. 154(b) by 0 days.

(21) Appl. No.: 11/227,179

(22) Filed: Sep. 16, 2005

(65) Prior Publication Data

US 2006/0063905 A1 Mar. 23, 2006

(30) Foreign Application Priority Data

Sep. 22, 2004 (JP) ............................. 2004-275389

(51) Int. Cl.
*C08F 77/08* (2006.01)
(52) U.S. Cl. ............................. 528/29; 528/31; 528/35; 528/14; 528/21
(58) Field of Classification Search ................... 528/14, 528/21, 29, 31, 35
See application file for complete search history.

(56) References Cited

U.S. PATENT DOCUMENTS

| 5,602,060 | A | | 2/1997 | Kobayashi et al. | |
|---|---|---|---|---|---|
| 5,811,564 | A | * | 9/1998 | Barnard et al. | 556/435 |
| 5,990,024 | A | * | 11/1999 | Blum et al. | 501/88 |
| 2003/0017635 | A1 | * | 1/2003 | Apen et al. | 438/29 |

FOREIGN PATENT DOCUMENTS

| EP | 1 308 476 A1 | 5/2003 |
|---|---|---|
| JP | 8-510292 | 10/1996 |
| JP | 2003-142477 | 5/2003 |
| JP | 2003-273100 | 9/2003 |

OTHER PUBLICATIONS

S. Yajima et al., "Synthesis of continuous silicon carbide fibre with high tensile strength and high Young's modulus", Journal of Materials Science, vol. 13, 1978, pp. 2569-2576.
Chris K. Whitmarsh et al., "Synthesis and Structure of a Highly Branched Polycarbosilane Derived from (Chloromethyl) trichlorosilane", Organometallics, vol. 10, No. 5, 1991, pp. 1336-1344.
L.V. Interrante et al. "Poly(silylenemethylenes)—a novel class of organosilicon polymers", Journal of Organometallic Chemistry, vol. 521, 1996, pp. 1-10.
U.S. Appl. No. 11/284,944, filed Nov. 23, 2005, Nakagawa et al.
U.S. Appl. No. 11/227,179, filed Sep. 16, 2005, Nakagawa et al.

* cited by examiner

*Primary Examiner*—Margaret G. Moore
(74) *Attorney, Agent, or Firm*—Oblon, Spivak, McClelland, Maier & Neustadt, P.C.

(57) ABSTRACT

A polycarbosilane, having a main chain in which silicon atoms and carbon atoms are alternately repeated, includes a repeating unit shown by a following general formula (1), a repeating unit shown by a following general formula (2), and a repeating unit shown by a following general formula (3).

$$-\!\!\left(\!\!\begin{array}{c}CH_3\\|\\Si-CH_2\\|\\H\end{array}\!\!\right)\!\!- \quad (1)$$

$$-\!\!\left(\!\!\begin{array}{c}CH_3\\|\\Si-CH_2\\|\\CH_3\end{array}\!\!\right)\!\!- \quad (2)$$

$$-\!\!\left(\!\!\begin{array}{c}CH_3\\|\\Si-CH_2\\|\\O\end{array}\!\!\right)\!\!- \quad (3)$$

20 Claims, No Drawings

POLYCARBOSILANE AND METHOD OF PRODUCING THE SAME

Japanese Patent Application No. 2004-275389, filed on Sep. 22, 2004, is hereby incorporated by reference in its entirety.

BACKGROUND OF THE INVENTION

The present invention relates to a novel polycarbosilane and a method of producing the same.

A polycarbosilane has attracted attention as a precursor for silicon carbide fibers and ceramic materials, and has been industrially utilized. In particular, a polycarbosilane having a main chain with a repeating structure of silicon atoms and carbon atoms exhibits excellent heat resistance and is widely utilized. The polycarbosilane is expected to be applied to optical functional materials, conductive materials, and the like.

As a method of producing a polycarbosilane having a main chain with a repeating structure of silicon atoms and carbon atoms, a method utilizing thermal rearrangement of poly(dimethylsilane) (Journal of Materials Science, 2569 to 2576, Vol. 13, 1978) can be given. According to this method, some methyl groups bonded to silicon atoms in poly(dimethylsilane) are inserted into Si—Si bonds in the main chain to form Si—C bonds, and the rearranged Si—CH$_3$ sites are replaced with Si—H bonds.

As other methods of producing a polycarbosilane, a method of producing a polycarbosilane from chloromethyltrichlorosilane through a Grignard reaction (Organometallics, 1336 to 1344, Vol. 10, 1991), and a method of producing a polycarbosilane by ring-opening polymerization of a disilacyclobutane (Journal of Organometallic Chemistry, 1 to 10, Vol. 521, 1996) can be given. These documents disclose a method of producing a polycarbosilane containing an Si—H bond by replacing a substituent on a silicon atom in a monomer with a chlorine atom, polymerizing the monomers, and reducing the resulting polymer by using lithium aluminum hydride or the like.

In related-art technology, a polycarbosilane is generally cured by (1) formation of Si—O—Si crosslinks by sintering in an oxidizing atmosphere (U.S. Pat. No. 5,602,060 and US-A-2003/17635) or (2) formation of Si—Si bonds by coupling between Si—H bonds and subsequent formation of Si—C—Si bonds by a rearrangement reaction (US-A-2003/17635). However, when the method (1) is utilized for a semiconductor integrated circuit manufacturing process, metal interconnects provided on a substrate may be oxidized so that the interconnect resistance may be increased. In the method (2), the curing reaction more easily proceeds as the content of the Si—H bonds in the polymer becomes higher. However, a dehydrogenation coupling reaction gradually occurs during storage, whereby the polymer may deteriorate.

As a polycarbosilane which solves the above-described problems, can be cured under reduced pressure or an inert gas atmosphere, and is chemically stable, (1) a polycarbosilane which is readily cured by heating or the like due to the presence of a crosslinkable side chain other than the Si—H bond or introduction of a mildly crosslinked structure before crosslinking, or (2) a polycarbosilane which further contains an appropriate amount of Si—H bond side chains to enable the dehydrogenation coupling reaction is preferable. In the case of a polycarbosilane which can be cured by only the mechanism described in (1), the amount of crosslink site in the polymer is increased. As a result, thermal stability and mechanical strength may be decreased when the crosslink site is an organic group, or resistance to processing such as etching and plasma processing may be decreased in semiconductor integrated circuit applications when the crosslink site is a siloxane structure. US-A-2003/17635 discloses a method of applying a polycarbosilane which does not contain an Si—O bond to a silicon wafer and heating the applied polycarbosilane in air to form an Si—O—Si bond by oxidation, and JP-A-2003-142477 and JP-T-8-510292 disclose polymers obtained by modifying a polycarbosilane containing an Si—H bond in an organic solvent by using alkali and water. However, a polycarbosilane which does not affect other materials such as interconnects when applied to a semiconductor integrated circuit manufacturing process and exhibits excellent storage stability has not yet been obtained.

SUMMARY

The invention may provide a polycarbosilane which is easily crosslinked and cured and exhibits excellent storage stability, and a method of producing the same.

A polycarbosilane according to one aspect of the invention has a main chain in which silicon atoms and carbon atoms are alternately repeated, and the polycarbosilane comprises:

a repeating unit shown by a following general formula (1), a repeating unit shown by a following general formula (2), and a repeating unit shown by a following general formula (3).

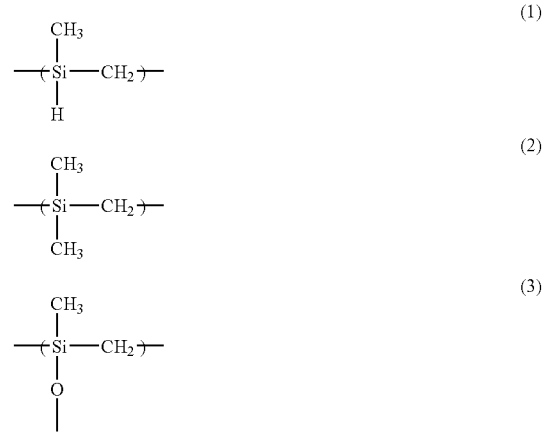

This polycarbosilane may further include at least one of repeating units shown by following formulas (4) to (10).

-continued

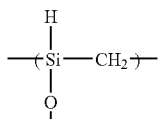
(6)

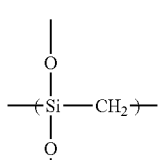
(7)

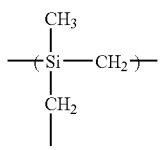
(8)

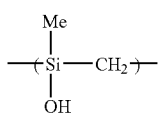
(9)

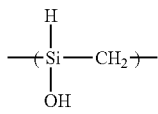
(10)

This polycarbosilane may have a weight average molecular weight of 300 to 1,000,000 and being soluble in an organic solvent.

A method of producing a polycarbosilane according to another aspect of the invention includes:

reacting a raw material polymer with at least one of water and alcohol in a presence of a basic catalyst, the raw material polymer having a main chain in which silicon atoms and carbon atoms are alternately repeated and including a repeating unit shown by a following general formula (1) and a repeating unit shown by a following general formula (2).

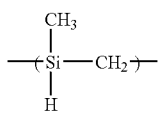
(1)

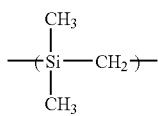
(2)

With this method of producing a polycarbosilane, the raw material polymer may include at least one of a repeating unit shown by a following general formula (4) and a repeating unit shown by a following general formula (5) or (8).

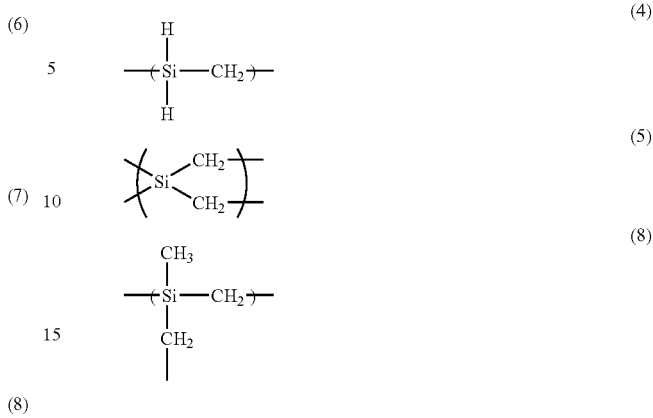
(4)

(5)

(8)

According to this polycarbosilane, the polymer can be crosslinked and cured by sintering in a nonoxidizing atmosphere such as an inert gas atmosphere or under reduced pressure due to the presence of the Si—H bond and the Si—O bond. This polycarbosilane also includes an appropriate amount of Si—$CH_3$ bonds important for etching resistance, ashing properties, and the like.

This polycarbosilane may be utilized for ceramics, heat-resistant plastic, electronic material interlayer film, and the like.

According to this method of producing a polycarbosilane, a polycarbosilane including an Si—H bond and an Si—O bond at an arbitrary ratio can be obtained in a high yield. Specifically, the percentage of the Si—O bond converted from the Si—H bond can be controlled by adjusting the amount of water and/or alcohol used. Therefore, a polycarbosilane in which the ratio of the Si—H bond and the Si—O bond is controlled can be obtained.

DETAILED DESCRIPTION OF THE EMBODIMENT

The polycarbosilane and the method of producing the same according to embodiments of the invention are described below.

1. Polycarbosilane

A polycarbosilane according to an embodiment of the invention has a main chain in which silicon atoms and carbon atoms are alternately repeated, and the polycarbosilane includes a repeating unit shown by a following general formula (1), a repeating unit shown by a following general formula (2), and a repeating unit shown by a following general formula (3). Specifically, the polycarbosilane according to one embodiment of the invention includes a main chain in which silicon atoms and carbon atoms are alternately repeated, and side chains containing a hydrogen atom, an oxygen atom, or a carbon atom bonded to the silicon atoms in the main chain.

(1)

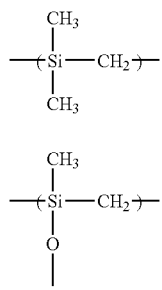
(2)

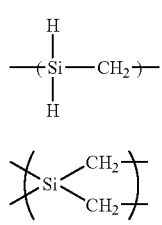
(3)

In the general formula (3), the oxygen atom may bond to a hydrogen atom, a silicon atom, or a carbon atom.

In one embodiment of the invention, the "main chain in which silicon atoms and carbon atoms are alternately repeated" has a structure shown by the following general formula (11), for example. In the general formula (11), the side chains bonded to the main chain are omitted. The number of silicon atoms and carbon atoms included in the main chain is not limited to that shown in the general formula (11). The type of side chain bonded to the main chain is not particularly limited. For example, the side chain may be —H, —OH, —OR(R represents an alkyl group having 1 to 6 carbon atoms, and may be derived from an alcohol used when producing the polycarbosilane according to one embodiment of the invention), or —O—Si.

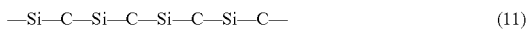
(11)

In the polycarbosilane according to one embodiment of the invention, it is preferable that the number of repeating units shown by the general formulas (1) to (3) be respectively 5 to 50%, 10 to 70%, and 5 to 50%.

This polycarbosilane may further include at least one of repeating units shown by following formulas (4) to (10).

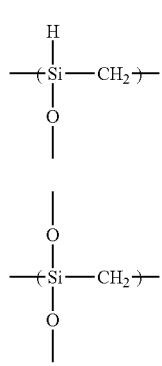

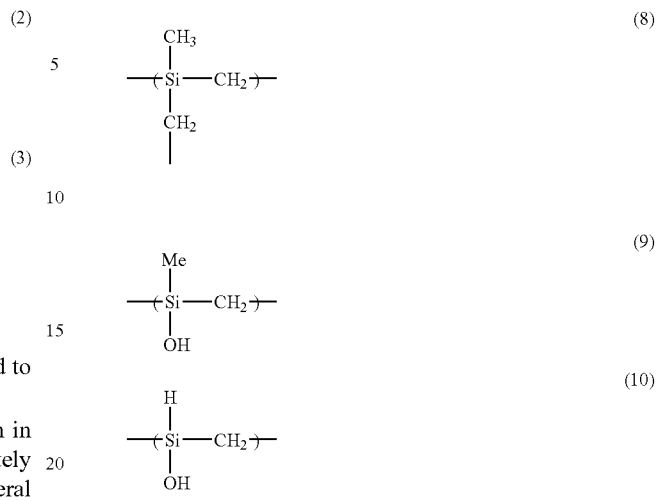

In the general formulas (6) and (7), the oxygen atom may bond to a hydrogen atom, a silicon atom, or a carbon atom. In the general formula (8), the carbon atom of methylene (—CH$_2$—) may bond to an oxygen atom, a silicon atom, or a carbon atom.

It is preferable that the polycarbosilane according to one embodiment of the invention be soluble in an organic solvent and have a weight average molecular weight of preferably 300 to 1,000,000, and still more preferably 500 to 100,000. If the weight average molecular weight is less than 300, the polymer may volatilize during sintering. If the weight average molecular weight exceeds 1,000,000, the polymer becomes insoluble in a solution so that a coating composition cannot be obtained.

2. Method of Producing Polycarbosilane

A method of producing a polycarbosilane according to another embodiment of the invention includes:

reacting a raw material polymer with at least one of water and alcohol in a presence of a basic catalyst, the raw material polymer having a main chain in which silicon atoms and carbon atoms are alternately repeated and including a repeating unit shown by a following general formula (1) and a repeating unit shown by a following general formula (2).

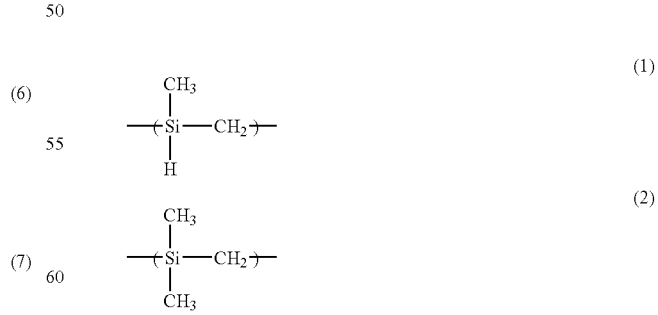

The raw material polymer may include at least one of a repeating unit shown by a following general formula (4) and a repeating unit shown by a following general formula (5) or (8).

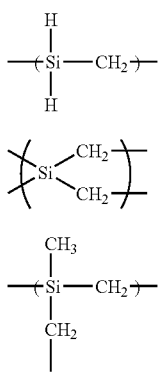

(4)

(5)

(8)

As examples of the raw material polymer used in the method of producing the polycarbosilane according to one embodiment of the invention, polymers shown by the following general formulas (12), (13), and (14) can be given.

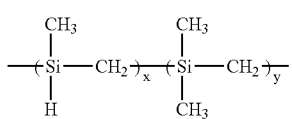

(12)

wherein x and y individually represent integers of one or more.

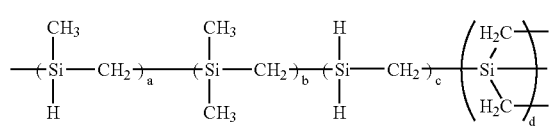

(13)

wherein a and b individually represent integers of one or more, and c and d individually represent integers with at least one of c and d being one or more.

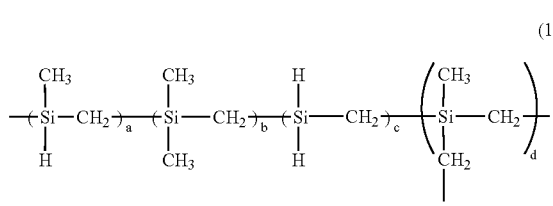

(14)

wherein a and b individually represent integers of one or more, and c and d individually represent integers with at least one of c and d being one or more.

As examples of the basic catalyst which may be used in the method of producing the polycarbosilane according to one embodiment of the invention, sodium hydroxide, potassium hydroxide, lithium hydroxide, cerium hydroxide, barium hydroxide, calcium hydroxide, pyridine, pyrrole, piperazine, pyrrolidine, piperidine, picoline, ammonia, methylamine, ethylamine, propylamine, butylamine, dimethylamine, diethylamine, dipropylamine, dibutylamine, trimethylamine, triethylamine, tripropylamine, tributylamine, monoethanolamine, diethanolamine, dimethylmonoethanolamine, monomethyldiethanolamine, triethanolamine, diazabicyclooctane, diazabicyclononane, diazabicycloundecene, urea, tetramethylammonium hydroxide, tetraethylammonium hydroxide, tetrapropylammonium hydroxide, tetrabutylammonium hydroxide, benzyltrimethylammonium hydroxide, choline, and the like can be given. Of these, ammonia, organic amines, and ammonium hydroxides are preferable, with tetramethylammonium hydroxide, tetraethylammonium hydroxide, and tetrapropylammonium hydroxide being particularly preferable. The basic catalyst may be used either individually or in combination of two or more.

The amount of basic catalyst used is determined depending on the number of Si—H bonds included in the raw material polycarbosilane.

As examples of the alcohol which may be used in the method of producing the polycarbosilane according to one embodiment of the invention, alcohols having 1 to 6 carbon atoms can be given. Specific examples include methanol, ethanol, n-propanol, iso-propanol, n-butanol, tert-butanol, sec-butanol, n-propanol, ethylene glycol, propylene glycol, glycerol, and the like.

In the method of producing the polycarbosilane according to one embodiment of the invention, some of the Si—H bonds are converted into Si—O bonds by reacting the raw material polymer with water and/or alcohol (ROH; R represents an alkyl group) in an organic solvent in the presence of the basic catalyst. In more detail, some of the Si—H bonds may be converted into a silanol (Si—OH) site, an alkoxysilane (Si—OR) site, or an Si—O—Si bond. When using water as the reactant, a dehydration-condensation reaction between silanol sites may occur after formation of the silanol sites. This results in formation of an Si—O—Si bond. A method of converting the Si—H bond into the Si—O bond by using water or alcohol in the presence of a metal, acid, or basic catalyst is disclosed in JP-A-2003-142477 and JP-T-8-510292.

A first synthesis example of the polycarbosilane according to one embodiment of the invention is shown in the following general formula (15). The first synthesis example illustrates the case where the raw material polymer is shown by the general formula (12).

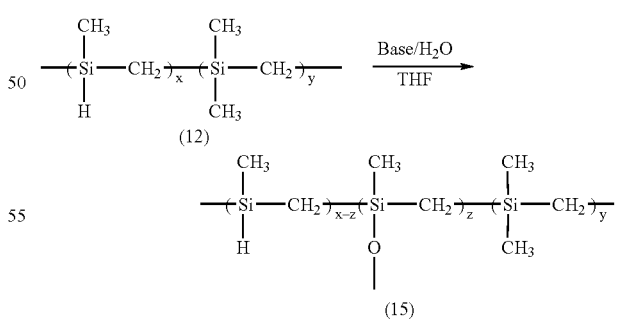

In the general formula (15), z represents an integer which satisfies x>z, and the oxygen atom may bond to a hydrogen atom, a silicon atom, or a carbon atom. Specifically, some of the Si—H bonds in the raw material polymer shown by the general formula (12) are converted into Si—O bonds by a rearrangement reaction to obtain a polycarbosilane shown by the general formula (15).

A second synthesis example of the polycarbosilane according to one embodiment of the invention is shown in the following general formula (16). The second synthesis example illustrates the case where the raw material polymer is shown by the general formula (13).

In the method of producing the polycarbosilane according to one embodiment of the invention, the Si—H bond formation reaction may be terminated by adding an acidic aqueous solution to the reaction system to deactivate the reaction system. When using water as the reactant, a further

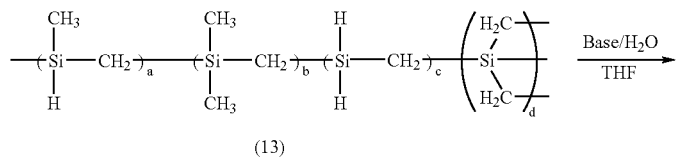

(13)

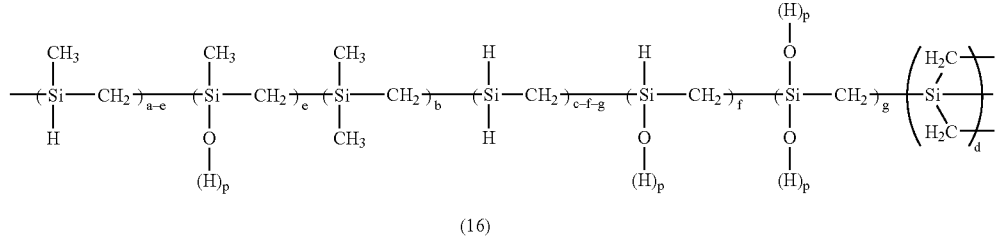

(16)

In the general formula (16), e represents an integer which satisfies a>e, f and g represent integers which satisfy c>f+g, p represents 0 or 1, and the oxygen atom may bond to a hydrogen atom, a silicon atom, or a carbon atom. Specifically, some of the Si—H bonds in the raw material polymer shown by the general formula (13) are converted into Si—O bonds by a rearrangement reaction to obtain a polycarbosilane shown by the general formula (16).

A third synthesis example of the polycarbosilane according to one embodiment of the invention is shown in the following general formula (17). The third synthesis example illustrates the case where the raw material polymer is shown by the general formula (14).

dehydration-condensation of silanol sites expected to be formed can be prevented. The acidic aqueous solution is not particularly limited. For example, an organic acid or an inorganic acid may be used. As examples of the organic acid, acetic acid, propionic acid, butanoic acid, pentanoic acid, hexanoic acid, heptanoic acid, octanoic acid, nonanoic acid, decanoic acid, oxalic acid, maleic acid, methylmalonic acid, adipic acid, sebacic acid, gallic acid, butyric acid, mellitic acid, arachidonic acid, shikimic acid, 2-ethylhexanoic acid, oleic acid, stearic acid, linolic acid, linoleic acid, salicylic acid, benzoic acid, p-aminobenzoic acid, p-toluenesulfonic acid, benzenesulfonic acid, monochloroacetic acid, dichloroacetic acid, trichloroacetic acid, trifluoroacetic acid, for-

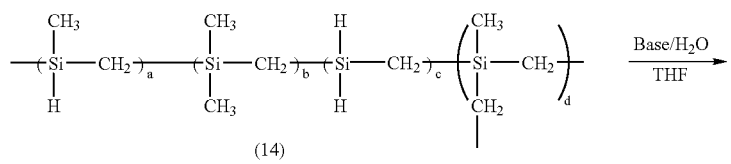

(14)

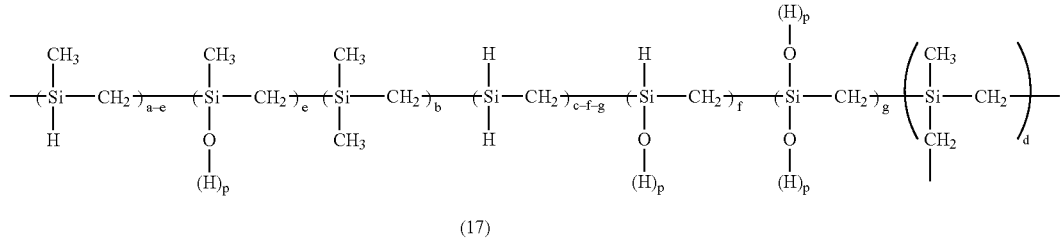

(17)

In the general formula (17), e represents an integer which satisfies a>e, f and g represent integers which satisfy c>f+g, p represents 0 or 1, and the oxygen atom may bond to a hydrogen atom, a silicon atom, or a carbon atom. Specifically, some of the Si—H bonds in the raw material polymer shown by the general formula (14) are converted into Si—O bonds by a rearrangement reaction to obtain a polycarbosilane shown by the general formula (17).

mic acid, malonic acid, sulfonic acid, phthalic acid, fumaric acid, citric acid, tartaric acid, maleic anhydride, fumaric acid, itaconic acid, succinic acid, mesaconic acid, citraconic acid, malic acid, malonic acid, hydrolysate of glutaric acid, hydrolysate of maleic anhydride, hydrolysate of phthalic anhydride, and the like can be given. As examples of the inorganic acid, hydrochloric acid, nitric acid, sulfuric acid, hydrofluoric acid, phosphoric acid, and the like can be given. Of these, the organic acid is preferable since polymer precipitation or gelation rarely occurs. As the organic acid, a compound containing a carboxyl group is preferable. In particular, acetic acid, oxalic acid, maleic acid, formic acid, malonic acid, phthalic acid, fumaric acid, itaconic acid, succinic acid, mesaconic acid, citraconic acid, malic acid, glutaric acid, and hydrolysate of maleic anhydride are preferable. These compounds may be used either individually or in combination of two or more.

In the method of producing the polycarbosilane according to one embodiment of the invention, the following organic solvents may be used. As the organic solvent used in one embodiment of the invention, an organic solvent in which water and/or alcohol used and the raw material polymer can be dissolved is preferable. As examples of the organic solvent, aliphatic hydrocarbon solvents such as n-pentane, i-pentane, n-hexane, i-hexane, n-heptane, i-heptane, 2,2,4-trimethylpentane, n-octane, i-octane, cyclohexane, and methylcyclohexane; aromatic hydrocarbon solvents such as benzene, toluene, xylene, ethylbenzene, trimethylbenzene, methylethylbenzene, n-propylebenzene, i-propylebenzene, diethylbenzene, i-butylbenzene, triethylbenzene, di-i-propylbenzene, n-amylnaphthalene, and trimethylbenzene (when using a hydrocarbon solvent and water, a hydrocarbon solvent and another solvent may be used in combination); ketone solvents such as acetone, methyl ethyl ketone, methyl n-propyl ketone, methyl n-butyl ketone, diethyl ketone, methyl i-butyl ketone, methyl n-pentyl ketone, ethyl n-butyl ketone, methyl n-hexyl ketone, di-i-butyl ketone, trimethylenonane, cyclohexanone, 2-hexanone, methylcyclohexanone, 2,4-pentanedione, acetonylacetone, diacetone alcohol, acetophenone, and fenchone; ether solvents such as ethyl ether, i-propyl ether, n-butyl ether, n-hexyl ether, 2-ethylhexyl ether, ethylene oxide, 1,2-propylene oxide, dioxolane, 4-methyl dioxolane, dioxane, dimethyl dioxane, ethylene glycol monomethyl ether, ethylene glycol monoethyl ether, ethylene glycol diethyl ether, ethylene glycol mono-n-butyl ether, ethylene glycol mono-n-hexyl ether, ethylene glycol monophenyl ether, ethylene glycol mono-2-ethyl butyl ether, ethylene glycol dibutyl ether, diethylene glycol monomethyl ether, diethylene glycol monoethyl ether, diethylene glycol dimethyl ether (diglyme), diethylene glycol diethyl ether, diethylene glycol mono-n-butyl ether, diethylene glycol di-n-butyl ether, diethylene glycol mono-n-hexyl ether, ethoxy triglycol, tetraethylene glycol di-n-butyl ether, tripropylene glycol monomethyl ether, tetrahydrofuran, and 2-methyltetrahydrofuran; nitrogen-containing solvents such as N-methylformamide, N,N-dimethylformamide, N,N-dimethylformamide, acetamide, N-methylacetamide, N,N-dimethylacetamide, N-methylpropioneamide, and N-methylpyrrolidone; sulfur-containing solvents such as dimethyl sulfide, diethyl sulfide, thiophene, tetrahydrothiophene, dimethylsulfoxide, sulfolane, and 1,3-propanesultone; alcohol solvents such as methanol, ethanol, n-propanol, isopropanol, n-butanol, tert-butanol, and sec-butanol (alcohol solvent also serves as the reactant); and the like can be given. These solvents may be used either individually or in combination of two or more. When used in combination with the above-mentioned solvent, aliphatic hydrocarbon solvents such as n-pentane, i-pentane, n-hexane, i-hexane, n-heptane, i-heptane, 2,2,4-trimethylpentane, n-octane, i-octane, cyclohexane, and methylcyclohexane; aromatic hydrocarbon solvents such as benzene, toluene, xylene, ethylbenzene, trimethylbenzene, methylethylbenzene, n-propylebenzene, i-propylebenzene, diethylbenzene, i-butylbenzene, triethylbenzene, di-i-propylbenzene, n-amylnaphthalene, trimethylbenzene; and the like may be used.

3. EXAMPLE

Examples according to the invention are described below. However, the invention is not limited to the following examples. Evaluation in experimental examples and comparative examples are carried out as follows.

3.1 Molecular Weight

The weight average molecular weight (Mw) and the number average molecular weight (Mn) of a polycarbosilane were measured by gel permeation chromatography (GPC) under the following conditions.

Sample: A sample was prepared by dissolving 1 g of a polymer in 100 cc of tetrahydrofuran as a solvent.

Standard polystyrene: standard polystyrene manufactured by Pressure Chemical Company Device: high-temperature high-speed gel permeation chromatogram (Model 150-C ALC/GPC) manufactured by Waters Corporation Column: SHODEX A-80M (length: 50 cm) manufactured by Showa Denko K.K.

Measurement temperature: 40° C.

Flow rate: 1 cc/min

3.2 NMR Spectrum

The $^1$H NMR spectrum (500 MHz) and the $^{29}$Si NMR spectrum (100 MHz) of a polycarbosilane were measured by using BRUKER AVANCE 500 (manufactured by Bruker).

3.3 Experimental Example 1

20 g of "Nipusi Type-S" manufactured by Nippon Carbon Co., Ltd. (hereinafter also called "raw material polymer 1") was dissolved in tetrahydrofuran to prepare 400 g of a reaction solution. After the addition of 5.0 ml of a tetramethylammonium hydroxide (TMAH) aqueous solution (1.0 mol/L), the reaction solution was heated at 50° C. for three hours. After cooling the reaction solution to room temperature, 10 ml of an oxalic acid aqueous solution (2.0 mol/L) was added to the reaction solution to terminate the reaction. After the addition of 100 g of cyclohexanone and 400 g of an oxalic acid aqueous solution (0.02 mol/L) to the reaction solution, the mixture was shaken and allowed to stand to separate the mixture into an organic phase and an aqueous phase. The organic phase was removed and concentrated to obtain 19.8 g of a polycarbosilane of Experimental Example 1.

The physical and chemical data for the polycarbosilane of Experimental Example 1 is given below. The structure of the polycarbosilane of Experimental Example 1 and assignment of NMR spectral data are shown in the following general formula (18) and Tables 1 and 2. In the general formula (18), x is 40% (0.4), y is 60% (0.6), and z is 10% (0.1). From the results of IR spectral data, the polycarbosilane of Experimental Example 1 is estimated to include an Si—OH site.

$^1$H NMR (in deuterated benzene) spectral data: −2.0 to 1.0 ppm (broad), 3.5 to 4.5 ppm (broad)

$^{29}$Si NMR (in deuterated benzene) spectral data: −40 to −30 ppm (broad), −20 to 10 ppm (broad), 10 to 30 ppm (broad); The peaks of the latter two overlap. The integral ratio of the three peaks was about 3:6:1.

IR spectral data (liquid film): 3670 cm$^{-1}$ (corresponds to Si—OH), 2950 cm$^{-1}$, 2900 cm$^{-1}$, 2096 cm$^{-1}$, 1360 cm$^{-1}$, 1250 cm$^{-1}$, 1030 cm$^{-1}$, 820 cm$^{-1}$ Molecular weight (GPC): Mw=7,100, Mn=720

TABLE I (18)

$$\left(\begin{array}{c}{}^{1)}CH_{3}\\|\\\underset{A)}{Si}{-}^{5)}CH_{2}\\|\\H_{2)}\end{array}\right)_{x-z}\left(\begin{array}{c}{}^{8)}CH_{3}\\|\\\underset{C)}{Si}{-}^{7)}CH_{2}\\|\\O\\|\end{array}\right)_{z}\left(\begin{array}{c}{}^{3)}CH_{3}\\|\\\underset{B)}{Si}{-}^{6)}CH_{2}\\|\\CH_{3\ 4)}\end{array}\right)_{y}$$

| Measurement method | δ (ppm) | Assignment |
|---|---|---|
| $^1$H NMR (in deuterated benzene) | −2.0 to 1.0 (broad) <br> 3.5 to 4.5 (broad) | 1), 3), 4), 5), 6), 7), 8) <br> 2) |

TABLE 2

| Measurement method | δ (ppm) | Assignment |
|---|---|---|
| $^{29}$Si NMR (in deuterated benzene) | −40 to −30 (broad) <br> −20 to 10 (broad) <br> −10 to 30 (broad) | A) <br> B) <br> C) |

A 4% butyl acetate solution of the resulting polymer was prepared and spin-coated on a silicon wafer at 2500 rpm to obtain a film. The film was sintered at 150° C. for one minute and at 400° C. for one minute on a hot plate in a nitrogen atmosphere. After measuring the thickness of the resulting film (corresponds to "film thickness after deposition" in Table 9), cyclohexanone (solvent) was spin-coated on the wafer at 2500 rpm, and the film was sintered at 150° C. and 400° C. The thickness of the resulting film (corresponds to "film thickness after solvent application and sintering" in Table 9) was measured to compare the film thicknesses before and after applying cyclohexanone. The results are shown in Table 9. In Table 9, the "film reduction rate (%)" indicates "{(film thickness after deposition)−(film thickness after solvent application and sintering)}/(film thickness after deposition)×100".

3.4 Experimental Example 2

20 g of "Nipusi Type-UH" manufactured by Nippon Carbon Co., Ltd. (hereinafter also called "raw material polymer 2") was dissolved in dioxane to prepare 400 g of a reaction solution. After the addition of 3.0 ml of pyridine and 4.0 ml of water, the reaction solution was heated at 80° C. for five hours. After cooling the reaction solution to room temperature, 10 ml of an acetic acid aqueous solution (2.0 mol/L) was added to the reaction solution to terminate the reaction. After the addition of 100 g of cyclohexanone and 400 g of an acetic acid aqueous solution (0.02 mol/L) to the reaction solution, the mixture was shaken and allowed to stand to separate the mixture into an organic phase and an aqueous phase. The organic phase was removed and concentrated to obtain 19.3 g of a polycarbosilane of Experimental Example 2.

The physical and chemical data for the polycarbosilane of Experimental Example 2 is given below. The structure of the polycarbosilane of Experimental Example 2 and assignment of the NMR spectral data are shown in the following general formula (19) and Tables 3 and 4. In the general formula (19), x is 40% (0.4), y is 60% (0.6), and z is 10% (0.1). From the results of IR spectral data, the polycarbosilane of Experimental Example 2 is estimated to include an Si—OH site.

$^1$H NMR (in deuterated benzene) spectral data: −2.0 to 1.0 ppm (broad), 3.5 to 4.5 ppm (broad)

$^{29}$Si NMR (in deuterated benzene) spectral data: −40 to −30 ppm (broad), −20 to 10 ppm (broad), 10 to 30 ppm (broad); The peaks of the latter two overlap. The integral ratio of the three peaks was about 3.5:6:0.5.

IR spectral data (liquid film): 3670 cm$^{-1}$ (corresponds to Si—OH), 2950 cm$^{-1}$, 2900 cm$^{-1}$, 2096 cm$^{-1}$, 1360 cm$^{-1}$, 1250 cm$^{-1}$, 1030 cm$^{-1}$, 820 cm$^{-1}$ Molecular weight (GPC): Mw=10,200, Mn=1,500

TABLE 3

(19)

$$\left(\begin{array}{c}{}^{1)}CH_{3}\\|\\\underset{A)}{Si}{-}^{5)}CH_{2}\\|\\H_{2)}\end{array}\right)_{x-z}\left(\begin{array}{c}{}^{8)}CH_{3}\\|\\\underset{C)}{Si}{-}^{7)}CH_{2}\\|\\O\\|\end{array}\right)_{z}\left(\begin{array}{c}{}^{3)}CH_{3}\\|\\\underset{B)}{Si}{-}^{6)}CH_{2}\\|\\CH_{3\ 4)}\end{array}\right)_{y}$$

| Measurement method | δ (ppm) | Assignment |
|---|---|---|
| $^1$H NMR (in deuterated benzene) | −2.0 to 1.0 (broad) <br> 3.5 to 4.5 (broad) | 1), 3), 4), 5), 6), 7), 8) <br> 2) |

TABLE 4

| Measurement method | δ (ppm) | Assignment |
|---|---|---|
| $^{29}$Si NMR (in deuterated benzene) | −40 to −30 (broad) <br> −20 to 10 (broad) <br> −10 to 30 (broad) | A) <br> B) <br> C) |

The resulting polymer was applied to a silicon wafer and sintered to evaluate the solvent dissolution resistance in the same manner as in Experimental Example 1. The results are shown in Table 9.

3.5 Comparative Example 1

Physical and chemical data for "Nipusi Type-S" manufactured by Nippon Carbon Co., Ltd. (raw material polymer 1)

$^1$H NMR (in deuterated benzene) spectral data: −2.0 to 1.0 ppm (broad), 3.5 to 4.5 ppm (broad)

$^{29}$Si NMR (in deuterated benzene) spectral data: −40 to −30 ppm (broad), −20 to 10 ppm (broad); The integral ratio of the two peaks was about 4:6.

IR spectral data (liquid film): 2950 cm$^{-1}$, 2900 cm$^{-1}$, 2096 cm$^{-1}$, 1360 cm$^{-1}$, 1250 cm$^{-1}$, 1030 cm$^{-1}$, 820 cm$^{-1}$ Molecular weight (GPC): Mw=3,000, Mn=500

The structure of Comparative Example 1 (raw material polymer 1) and assignment of the NMR spectral data are shown in the following general formula (20) and Tables 5 and 6. In the general formula (20), x is 40% (0.4) and y is 60% (0.6).

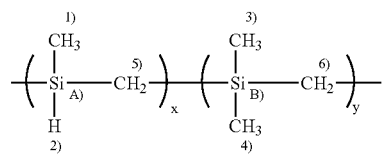

(20)

| Measurement method | δ (ppm) | Assignment |
|---|---|---|
| ¹H NMR (in deuterated benzene) | −2.0 to 1.0 (broad) 3.5 to 4.5 (broad) | 1), 3), 4), 5), 6) 2) |

TABLE 6

| Measurement method | δ (ppm) | Assignment |
|---|---|---|
| ²⁹Si NMR (in deuterated benzene) | −40 to −30 (broad) −20 to 10 (broad) | A) B) |

The ²⁹Si NMR spectral data for the polycarbosilane of Experimental Example 1 has an additional peak at 10 to 30 ppm in comparison with the ²⁹Si NMR spectral data for Comparative Example 1 (raw material polymer 1). This peak is estimated to indicate the silicon atom bonded to the oxygen atom.

While the integral ratio of the three peaks in the ²⁹Si NMR spectral data for the polycarbosilane of Experimental Example 1 was about 3:6:1, the integral ratio of the two peaks in the ²⁹Si NMR spectral data for the raw material polymer 1 as Comparative Example 1 was about 4:6. This suggests that some of the Si—H bonds (about 25 mol % of the Si—H bonds) in the raw material polymer 1 were converted into Si—O bonds so that the polycarbosilane of Experimental Example 1 was obtained. Specifically, it was confirmed that the polycarbosilane of Experimental Example 1 had an Si—H bond and an Si—O bond.

The raw material polymer 1 was applied to a silicon wafer and sintered to evaluate the solvent dissolution resistance in the same manner as in Experimental Example 1. The results are shown in Table 9.

3.6 Comparative Example 2

Physical and chemical data for "Nipusi Type-UH" manufactured by Nippon Carbon Co., Ltd. (raw material polymer 2)

¹H NMR (in deuterated benzene) spectral data: −2.0 to 1.0 ppm (broad), 3.5 to 4.5 ppm (broad)

²⁹Si NMR (in deuterated benzene) spectral data: −40 to −30 ppm (broad), −20 to 10 ppm (broad); The integral ratio of the two peaks was about 4:6.

IR spectral data (liquid film): 2950 cm⁻¹, 2900 cm⁻¹, 2096 cm⁻¹, 1360 cm⁻¹, 1250 cm⁻¹ 1030 cm⁻¹, 820 cm⁻¹

Molecular weight (GPC): Mw=5,000, Mn=1,000

The structure of Comparative Example 2 (raw material polymer 2) and assignment of the NMR spectral data are shown in the following general formula (21) and Tables 7 and 8. In the general formula (21), x is 40% (0.4) and y is 60% (0.6).

TABLE 7

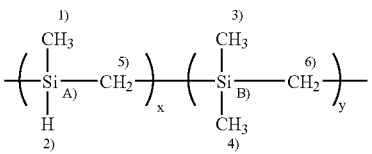

(21)

| Measurement method | δ (ppm) | Assignment |
|---|---|---|
| ¹H NMR (in deuterated benzene) | −2.0 to 1.0 (broad) 3.5 to 4.5 (broad) | 1), 3), 4), 5), 6) 2) |

TABLE 8

| Measurement method | δ (ppm) | Assignment |
|---|---|---|
| ²⁹Si NMR (in deuterated benzene) | −40 to −30 (broad) −20 to 10 (broad) | A) B) |

The ²⁹Si NMR spectral data for the polycarbosilane of Experimental Example 2 has an additional peak at 10 to 30 ppm in comparison with the ²⁹Si NMR spectral data for Comparative Example 2 (raw material polymer 2). This peak is estimated to indicate the silicon atom bonded to the oxygen atom.

While the integral ratio of the three peaks in the ²⁹Si NMR spectral data for the polycarbosilane of Experimental Example 2 was about 3.5:6:0.5, the integral ratio of the two peaks in the ²⁹Si NMR spectral data for the raw material polymer 2 as Comparative Example 2 was about 4:6. This suggests that some of the Si—H bonds (about 13 mol % of the Si—H bonds) in the raw material polymer 2 were converted into Si—O bonds so that the polycarbosilane of Experimental Example 2 was obtained. Specifically, it was confirmed that the polycarbosilane of Experimental Example 2 had an Si—H bond and an Si—O bond.

The raw material polymer 2 was applied to a silicon wafer and sintered to evaluate the solvent dissolution resistance in the same manner as in Experimental Example 1. The results are shown in Table 9.

TABLE 9

| | Raw material polymer | Film thickness after deposition (nm) | Film thickness after solvent application and sintering (nm) | Film reduction rate (%) |
|---|---|---|---|---|
| Experimental Example 1 | Raw material polymer 1 | 110 | 110 | 0 |
| Experimental Example 2 | Raw material polymer 2 | 120 | 119 | 1 |
| Comparative Example 1 | Raw material polymer 1 | 113 | 35 | 69 |
| Comparative Example 2 | Raw material polymer 2 | 118 | 32 | 73 |

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A polycarbosilane having a main chain in which silicon atoms and carbon atoms are alternately repeated, the polycarbosilane comprising:
a repeating unit shown by a following general formula (1), a repeating unit shown by a following general formula (2), and a repeating unit shown by a following general formula (3);

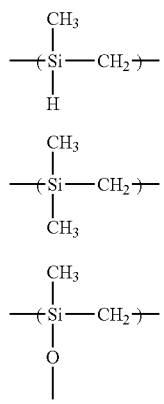

wherein the number of repeating units of general formula (1) is 5-50%,
the number of repeating units of general formula (2) is 10-70%, and
the number of repeating units of general formula (3) is 5-50%;
the percentages being relative to the total number of repeating units in the polycarbosilane.

2. The polycarbosilane as defined by claim 1, further comprising at least one of repeating units shown by following formulas (4) to (10):

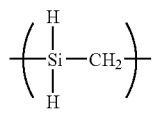

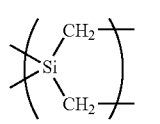

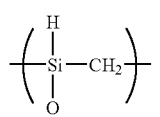

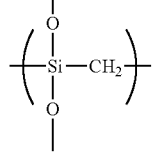

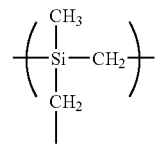

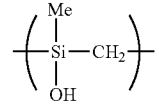

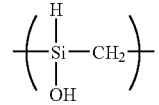

3. The polycarbosilane as defined by claim 1, wherein the polycarbosilane has a weight average molecular weight of 300 to 1,000,000 and is soluble in an organic solvent.

4. A method of producing a polycarbosilane comprising:
reacting a raw material polymer with at least one selected from the group consisting of water and alcohol in a presence of a basic catalyst,
wherein
the raw material polymer comprises:
a main chain wherein silicon atoms and carbon atoms are alternately repeated;
a repeating unit shown by a following general formula (1); and
a repeating unit shown by a following general formula (2):

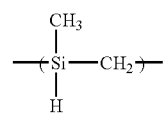

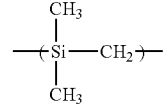

and the polycarbosilane comprises:
a repeating unit shown by general formula (1), a repeating unit shown by general formula (2), and a repeating unit shown by following general formula (3):

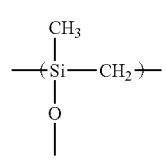

wherein
the number of repeating units of general formula (1) in the polycarbosilane is 5-50%,
the number of repeating units of general formula (2) in the polycarbosilane is 10-70%, and the number of repeating units of general formula (3) in the polycarbosilane is 5-50%;

the percentages being relative to the total number of repeating units in the polycarbosilane.

5. The method of producing a polycarbosilane as defined by claim 4, wherein the raw material polymer further comprises at least one selected from the group of repeating units shown by following general formulas (4), (5) and (8);

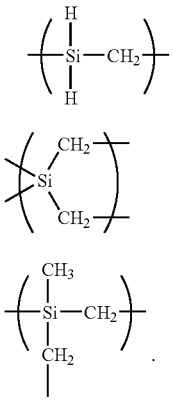

6. The method of producing a polycarbosilane as defined by claim 4, further comprising:

adjusting an amount of water and/or alcohol; and
controlling a ratio of Si—H and Si—O bonds.

7. The method according to claim 4 wherein the basic catalyst is at least one selected from the group consisting of sodium hydroxide, potassium hydroxide, lithium hydroxide, cerium hydroxide, barium hydroxide, calcium hydroxide, pyridine, pyrrole, piperazine, pyrrolidine, piperidine, picoline, ammonia, methylamine, ethylamine, propylamine, butylamine, dimethylamine, diethylamine, dipropylamine, dibutylamine, trimethylamine, triethylamine, tripropylamine, tributylamine, monoethanolamine, diethanolamine, dimethylmonoethanolamine, monomethyldiethanolamine, triethanolamine, diazabicyclooctane, diazabicyclononane, diazabicycloundecene, urea, tetramethylammonium hydroxide, tetraethylammonium hydroxide, tetrapropylammonium hydroxide, tetrabutylammonium hydroxide, benzyltrimethylammonium hydroxide, and choline.

8. The method according to claim 7, wherein the basic catalyst is at least one selected from the group consisting of tetramethylammonium hydroxide, tetraethylammonium hydroxide, and tetrapropylammonium hydroxide.

9. The method according to claim 4, wherein the reacting a raw material polymer is reacting with an alcohol.

10. The method according to claim 9, wherein the alcohol is an alcohol comprising 1-6 carbon atoms.

11. The method according to claim 10 wherein the alcohol is at least one selected from the group consisting of methanol, ethanol, n-propanol, iso-propanol, n-butanol, tert-butanol, sec-butanol, n-propanol, ethylene glycol, propylene glycol and glycerol.

12. The method according to claim 4, wherein the reacting a raw material polymer with at least one selected from the group consisting of water and alcohol in a presence of a basic catalyst comprises reacting in a solvent or a combination of two or more solvents.

13. The method according to claim 12 wherein the solvent or combination of two or more solvents comprises a solvent wherein the water and/or alcohol is soluble.

14. The method according to claim 13 wherein the solvent is at least one selected from the group consisting of n-pentane, i-pentane, n-hexane, i-hexane, n-heptane, i-heptane, 2,2,4-trimethylpentane, n-octane, i-octane, cyclohexane, and methylcyclohexane benzene, toluene, xylene, ethylbenzene, trimethylbenzene, methylethylbenzene, n-propylebenzene, i-propylebenzene, diethylbenzene, i-butylbenzene, triethylbenzene, di-i-propylbenzene, n-amylnaphthalene, trimethylbenzene, acetone, methyl ethyl ketone, methyl n-propyl ketone, methyl n-butyl ketone, diethyl ketone, methyl i-butyl ketone, methyl n-pentyl ketone, ethyl n-butyl ketone, methyl n-hexyl ketone, di-i-butyl ketone, trimethylenonane, cyclohexanone, 2-hexanone, methylcyclohexanone, 2,4-pentanedione, acetonylacetone, diacetone alcohol, acetophenone, fenchone; ethyl ether, i-propyl ether, n-butyl ether, n-hexyl ether, 2-ethylhexyl ether, ethylene oxide, 1,2-propylene oxide, dioxolane, 4-methyl dioxolane, dioxane, dimethyl dioxane, ethylene glycol monomethyl ether, ethylene glycol monoethyl ether, ethylene glycol diethyl ether, ethylene glycol mono-n-butyl ether, ethylene glycol mono-n-hexyl ether, ethylene glycol monophenyl ether, ethylene glycol mono-2-ethyl butyl ether, ethylene glycol dibutyl ether, diethylene glycol monomethyl ether, diethylene glycol monoethyl ether, diethylene glycol dimethyl ether (diglyme), diethylene glycol diethyl ether, diethylene glycol mono-n-butyl ether, diethylene glycol di-n-butyl ether, diethylene glycol mono-n-hexyl ether, ethoxy triglycol, tetraethylene glycol di-n-butyl ether, tripropylene glycol monomethyl ether, tetrahydrofuran, and 2-methyltetrahydrofuran, N-methylformamide, N,N-dimethylformamide, N,N-dimethylformamide, acetamide, N-methylacetamide, N,N-dimethylacetamide, N-methylpropioneamide, N-methylpyrrolidone, dimethyl sulfide, diethyl sulfide, thiophene, tetrahydrothiophene, dimethylsulfoxide, sulfolane, 1,3-propanesultone, methanol, ethanol, n-propanol, isopropanol, n-butanol, tert-butanol, and sec-butanol.

15. The method of producing a polycarbosilane as defined by claim 4, further comprising adding an acidic aqueous solution wherein the adding the acidic aqueous solution is after the reacting a raw material polymer with at least one selected from the group consisting of water and alcohol in a presence of a basic catalyst.

16. The method as defined in claim 15 wherein the acidic aqueous solution comprises one selected from the group consisting of an organic acid and an inorganic acid.

17. The method as defined in claim 16, wherein the acidic aqueous solution comprises an organic acid selected from the group consisting of acetic acid, oxalic acid, maleic acid, formic acid, malonic acid, phthalic acid, fumaric acid, itaconic acid, succinic acid, mesaconic acid, citraconic acid, malic acid, glutaric acid, and a hydrolysate of maleic anhydride.

18. The method as defined in claim 16, wherein the acidic aqueous solution comprises an inorganic acid selected from the group consisting of hydrochloric acid, nitric acid, sulfuric acid, hydrofluoric acid and phosphoric acid.

19. The method as defined in claim 4 wherein in the raw material polymer:

the number of repeating units of general formula (1) is 5-50%;

the number of repeating units of general formula (2) is 10-70%; and the percentages are relative to the total number of repeating units in the polycarbosilane.

20. The polycarbosilane as defined by claim 3, wherein the polycarbosilane has a weight average molecular weight of 500 to 100,000.

* * * * *